United States Patent
Strohmeier et al.

(10) Patent No.: US 11,414,441 B2
(45) Date of Patent: *Aug. 16, 2022

(54) SILANE, RUBBER MIXTURE CONTAINING THE SILANE, VEHICLE TIRE COMPRISING THE RUBBER MIXTURE IN AT LEAST ONE COMPONENT, AND PROCESS FOR PRODUCING THE SILANE

(71) Applicant: Continental Reifen Deutschland GmbH, Hannover (DE)

(72) Inventors: Julian Strohmeier, Einbeck (DE); Julia Schöffel, Hannover (DE); Andreas Jacob, Hannover (DE); Jaana Jürges, Sehnde (DE); Julien Davin, Hessisch Oldendorf (DE); David-Raphael Dauer, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/594,675

(22) PCT Filed: Mar. 25, 2020

(86) PCT No.: PCT/EP2020/058404
§ 371 (c)(1),
(2) Date: Oct. 26, 2021

(87) PCT Pub. No.: WO2020/216567
PCT Pub. Date: Oct. 29, 2020

(65) Prior Publication Data
US 2022/0144863 A1    May 12, 2022

(30) Foreign Application Priority Data
Apr. 26, 2019    (DE) ................ 10 2019 205 996.1

(51) Int. Cl.
*C07F 7/18*     (2006.01)
*C08K 9/06*     (2006.01)
*B60C 1/00*     (2006.01)
*C08K 3/36*     (2006.01)
*C08L 9/06*     (2006.01)
*C08K 5/548*    (2006.01)

(52) U.S. Cl.
CPC .......... *C07F 7/1804* (2013.01); *B60C 1/0016* (2013.01); *B60C 1/0025* (2013.01); *C07F 7/1892* (2013.01); *C08K 3/36* (2013.01); *C08K 5/548* (2013.01); *C08K 9/06* (2013.01); *C08L 9/06* (2013.01)

(58) Field of Classification Search
CPC ... B60C 1/0016; B60C 1/0025; C07F 7/1804; C07F 7/1892; C08K 3/36; C08K 5/548; C08K 9/06; C08L 9/06
See application file for complete search history.

(56) References Cited

U.S. PATENT DOCUMENTS

| | | | |
|---|---|---|---|
| 4,229,333 A | 10/1980 | Wolff et al. | |
| 2003/0236424 A1 | 12/2003 | Yanagisawa et al. | |
| 2005/0277781 A1 | 12/2005 | Cruse et al. | |
| 2009/0221751 A1 | 9/2009 | Hasse et al. | |
| 2012/0296023 A1 | 11/2012 | Tsuchida et al. | |
| 2019/0176124 A1* | 6/2019 | Wilson | B01J 20/3204 |

FOREIGN PATENT DOCUMENTS

| | | |
|---|---|---|
| DE | 2255577 A1 | 6/1974 |
| DE | 2536674 A1 | 2/1977 |
| DE | 102006004062 A1 | 8/2007 |
| EP | 1375504 A1 | 1/2004 |
| EP | 2524924 A1 | 11/2012 |
| JP | 2012149189 A | 8/2012 |
| WO | 9909036 A1 | 2/1999 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |
| WO | 2010049216 A2 | 5/2010 |
| WO | 2017036268 A1 | 3/2017 |
| WO | 2019001822 A1 | 1/2019 |
| WO | 2019001823 A1 | 1/2019 |

OTHER PUBLICATIONS

U.S. Appl. No. 16/765,042, filed 2020.*
U.S. Appl. No. 16/765,051, filed 2020.*
T. Timothy Nadasdi et al. / Synthesis, Structure, and Reactivity of Lewis Acidic Cyclopentadienyltitanium Dithiolate Complexes.
International Search Report dated Jun. 4, 2020 of International application PCT/EP2020/058404 on which this application is based.

* cited by examiner

*Primary Examiner* — Edward J Cain
(74) *Attorney, Agent, or Firm* — David L. Cate; Gregory Adams

(57) ABSTRACT

The invention relates to a silane, to a rubber mixture comprising the silane and to a vehicle tire which comprises the rubber mixture in at least one component, and to a process for producing the silane.
The silane of the invention has the following formula I)

$(R^1)_o Si-R^2-S-R^3-S-R^3-S-X$,    I)

which, according to the invention, comprises the $-R^2-S-R^3-S-R^3-$ unit in the spacer group.
The rubber mixture of the invention comprises at least one silane of the invention.

7 Claims, No Drawings

SILANE, RUBBER MIXTURE CONTAINING THE SILANE, VEHICLE TIRE COMPRISING THE RUBBER MIXTURE IN AT LEAST ONE COMPONENT, AND PROCESS FOR PRODUCING THE SILANE

The invention relates to a silane, to a rubber mixture comprising the silane and to a vehicle tire which comprises the rubber mixture in at least one component, and to a process for preparing the silane.

Silanes are known as additives for rubber mixtures, especially for vehicle tires, and in particular specifically for rubber mixtures containing at least one silica as filler. Silanes known from the prior art are disclosed, for example, in DE 2536674 C3 and DE 2255577 C3. The silica in this case is attached to the polymer(s) by means of such silanes, the silanes as a result also being referred to as coupling agents. The attachment of the silica by means of silane coupling agents is advantageous with respect to the rolling resistance characteristics and processability of the rubber mixture. To this end the silane typically has at least one sulfur moiety which takes part in the vulcanization of the rubber mixture.

It is possible in principle to draw a distinction between silanes that bind solely to silica or comparable fillers and especially have at least one silyl group for the purpose, and silanes that have, in addition to a silyl group, a reactive sulfur moiety such as, in particular, an $S_x$ moiety (with x> or equal to 2) or a mercapto group S—H or blocked S-PG moiety where PG represents a protecting group, such that the silane can also bind to polymers in the sulfur vulcanization by reaction of the $S_x$ or S—H moiety or the S-PG moiety after removal of the protecting group. The presence of —H or -PG can also be expressed by X.

There are additionally approaches in the prior art to vary the length of the spacer group between the silyl group and the $S_x$ or S—X moiety.

For instance, EP 1375504 B1 discloses silanes having exactly one lengthening thioether unit within the spacer group.

It is an object of the present invention to provide a novel silane and to provide a rubber mixture comprising the silane, by means of which a further improvement in the profile of properties including rolling resistance characteristics, grip characteristics, especially wet grip, and stiffness, and hence in the handling predictors in particular of the rubber mixture, especially for use in vehicle tyres, is achieved by comparison with the prior art.

The object is achieved by the silane of the invention as claimed in claim 1, by the silica modified with the silane of the invention, by the rubber mixture of the invention comprising the silane, and by the vehicle tire of the invention that comprises the rubber mixture of the invention in at least one component. The object is also achieved by the process for preparing the silane as claimed in claim 10.

The silane of the invention has the following formula I):

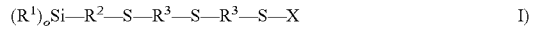

$(R^1)_o Si—R^2—S—R^3—S—R^3—S—X$      I)

where o may be 1, 2 or 3 and the $R^1$ radicals may be identical or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups —O—$(R^6—O)_r$—$R^5$ where $R^6$ are identical or different and are branched or unbranched, saturated or unsaturated, aliphatic, aromatic or mixed aliphatic/aromatic bridging $C_1$-$C_{30}$ hydrocarbon groups, preferably —$CH_2$—$CH_2$—, r is an integer from 1 to 30, preferably 3 to 10, and $R^5$ are unsubstituted or substituted, branched or unbranched, terminal alkyl, alkenyl, aryl or aralkyl groups, preferably —$C_{13}H_{27}$ alkyl group, or two $R^1$ form a cyclic dialkoxy group having 2 to 10 carbon atoms, in which case o is <3, or two or more silanes of formula I) may be bridged via $R^1$ radicals; and where $R^2$ and $R^3$ may be identical or different and are selected from the group consisting of linear or branched alkylene groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms; and where the X group is a hydrogen atom or a —C(=O)—$R^4$ group or an —$SiR^7_3$ group, where $R^4$ and $R^7$ are selected from $C_1$-$C_{20}$-alkyl groups, $C_4$-$C_{10}$-cycloalkyl groups, $C_6$-$C_{20}$-aryl groups, $C_2$-$C_{20}$-alkenyl groups and $C_7$-$C_{20}$-aralkyl groups, and $R^7$ is additionally selected from alkoxy groups having 1 to 10 carbon atoms, cycloalkoxy groups having 4 to 10 carbon atoms, phenoxy groups having 6 to 20 carbon atoms; and where the silane may also take the form of oligomers formed via hydrolysis and condensation of silanes of the formula I).

Compared to silanes known from the prior art, the inventive silane having the —$R^2$—S—$R^3$—S—$R^3$— group has a comparatively long spacer group comprising two thioether units. The invention thus provides a novel silane. A rubber mixture containing the silane of the invention has an optimized profile of properties comprising rolling resistance characteristics and stiffness. The rubber mixture of the invention thus exhibits a certain improvement with respect to the profile of properties comprising handling predictors, and the vehicle tire of the invention displays improved handling characteristics inter alia.

The silane of the invention and preferred embodiments thereof will be explained hereinafter. All aspects are also applicable to the silane in the rubber mixture of the invention and in the vehicle tire of the invention, and to the preparation process, unless explicitly stated otherwise.

Within the context of the present invention, the terms "radical" and "group" are used synonymously in connection with chemical formula constituents.

As shown in formula I), the silane of the invention is a blocked mercaptosilane having the S—X moiety where X, on account of its properties specified in detail, is a hydrogen atom or a protecting group, such that the sulfur is then activated as described at the outset by removal of the protecting group, in order to be able to take part in a sulfur vulcanization.

The X group is a hydrogen atom or a —C(=O)—$R^4$ group or an —$SiR^7_3$ group where $R^4$ and $R^7$ are selected from $C_1$-$C_{20}$-alkyl groups, $C_4$-$C_{10}$-cycloalkyl groups, $C_6$-$C_{20}$-aryl groups, $C_2$-$C_{20}$ alkenyl groups and $C_7$-$C_{20}$-aralkyl groups, and $R^7$ is additionally selected from alkoxy groups having 1 to 10 carbon atoms, cycloalkoxy groups having 4 to 10 carbon atoms, phenoxy groups having 6 to 20 carbon atoms.

In particularly advantageous embodiments of the invention, X is a —C(=O)—$R^4$ group or an —$SiR^7_3$ group, which means that the silane of the invention in these advantageous embodiments is a blocked mercaptosilane. This has the advantage that the sulfur can take part in chemical reactions only after removal of the groups mentioned for X, and no unwanted side reactions occur beforehand. The silane is thus more easily processible, and especially more easily mixed into a rubber mixture.

More preferably, the X group is a —C(=O)—$R^4$ group where $R^4$ is selected from $C_1$-$C_{20}$-alkyl groups.

$R^4$ here is most preferably selected from $C_1$ to $C_7$-alkyl groups, preferably in turn $C_1$-$C_3$-alkyl groups, especially a $C_1$-alkyl group, for example, i.e. a methyl group.

The $R^1$ radicals of the silane of the invention within the silyl group $(R^1)_oSi$— may be identical or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups —O—($R^6$—O)$_r$—$R^5$ where $R^6$ are identical or different and are branched or unbranched, saturated or unsaturated, aliphatic, aromatic or mixed aliphatic/aromatic bridging $C_1$-$C_{30}$ hydrocarbon groups, preferably —CH$_2$—CH$_2$—, r is an integer from 1 to 30, preferably 3 to 10, and $R^5$ are unsubstituted or substituted, branched or unbranched, terminal alkyl, alkenyl, aryl or aralkyl groups, preferably —$C_{13}H_{27}$ alkyl group, or two $R^1$ form a cyclic dialkoxy group having 2 to 10 carbon atoms, in which case o is <3, or two or more silanes of formula I) may be bridged via $R^1$ radicals.

All of the recited $R^1$ radicals and linkages may be combined with one another within a silyl group.

Where two silanes of formula I) are bridged to one other, they share an $R^1$ radical. It is also possible for more than two silanes to be joined to one another in this way. Following the synthesis of the silane of formula I), it is thus conceivable for two silanes of formula I) to be bridged to one other via the $R^1$ radicals. It is also possible for more than two silanes to be joined to one another in this way, for example via dialkoxy groups.

The silane of the invention may also comprise oligomers that are formed by hydrolysis and condensation of silanes of the formula I). This firstly encompasses oligomers of two or more silanes of formula I). According to the invention, this secondly also encompasses oligomers that are formed by condensation of at least one silane of formula I) with at least one further silane that does not conform to formula I). The "further silane" may in particular be silane coupling agents known to those skilled in the art.

The silane of formula I), in an advantageous embodiment, especially for use of the silane in a silica-containing rubber mixture, comprises, in each silyl group $(R^1)_oSi$—, at least one $R^1$ radical that can serve as leaving group, such as, in particular, alkoxy groups or any other of the mentioned groups that are bonded by an oxygen atom to the silicon atom, or halides.

The $R^1$ radicals preferably comprise alkyl groups having 1 to 6 carbon atoms or alkoxy groups having 1 to 6 carbon atoms, or halides, more preferably alkoxy groups having 1 to 6 carbon atoms, or halides.

In a particularly advantageous embodiment of the invention, the $R^1$ radicals within a silyl group $(R^1)_oSi$— are identical and are alkoxy groups having 1 or 2 carbon atoms, i.e. methoxy groups or ethoxy groups, most preferably ethoxy groups, where o=3.

But even in the case of oligomers or if two $R^1$ form a dialkoxy group, the remaining $R^1$ radicals are preferably alkyl groups having 1 to 6 carbon atoms or halides or alkoxy groups having 1 to 6 carbon atoms, preferably 1 or 2 carbon atoms, i.e. methoxy groups or ethoxy groups, most preferably ethoxy groups.

The $R^2$ and $R^3$ radicals of the silane of the invention may be identical or different within a molecule and are selected from the group consisting of linear or branched alkylene groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms.

It is preferable that the $R^3$ radicals are identical or different and are linear or branched alkyl radicals having 1 to 20 carbon atoms, preferably 1 to 10 carbon atoms, more preferably 2 to 6 carbon atoms, especially, for example, 6 carbon atoms, or cycloalkyl groups having 4 to 8 carbon atoms.

In a particularly advantageous embodiment, the $R^3$ radicals are identical and are linear alkylene radicals having 1 to 20 carbon atoms, preferably 2 to 10 carbon atoms, more preferably 4 to 8 carbon atoms, especially, for example, 6 carbon atoms.

It is preferable that the $R^2$ radical is a linear or branched alkylene group having 2 to 8 carbon atoms or cycloalkyl group having 4 to 8 carbon atoms, such as a cyclohexyl radical in particular.

In a particularly advantageous embodiment of the invention, $R^2$ is a linear or branched alkylene group having 2 to 8 carbon atoms, preferably having 2 to 6 carbon atoms, more preferably having 2 to 4 carbon atoms, especially preferably 2 or 3 carbon atoms, very particular preference being given, for example, to propylene radicals having 3 carbon atoms.

In a particularly preferred and illustrative embodiment of the invention, the silane of the invention has the following formula II):

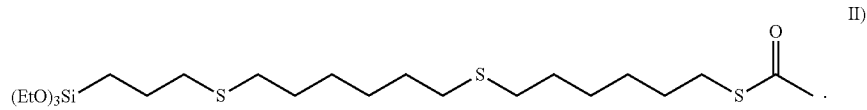

II)

In this context, with regard to formula I), o=3, all $R^1$ are ethoxy groups, $R^2$ is a propylene radical, X is a —C(=O)—$R^4$ with $R^4$=methyl, and the $R^3$ radicals are hexylene groups.

The silane of formula II) constitutes a preferred inventive example. This achieves a particularly good profile of properties for achievement of the technical object.

The present invention further provides a process for preparing the inventive silane of formula I). The process of the invention comprises at least the following process steps:

a) providing a substance $(R^1)_o Si\text{—}R^2\text{—}SH$;
b) providing a substance $Cl\text{—}R^3\text{—}Cl$;
c) reacting the substance from step a) with the substance from step b) in the presence of a base to give $(R^1)_o Si\text{—}R^2\text{—}S\text{—}R^3\text{—}Cl$;
d) reacting $(R^1)_o Si\text{—}R^2\text{—}S\text{—}R^3\text{—}Cl$ from step c) with a metallic hydrogensulfide (M-S—H) to give $(R^1)_o Si\text{—}R^2\text{—}S\text{—}R^3\text{—}SH$, where M is metal;
e) reacting $(R^1)_o Si\text{—}R^2\text{—}S\text{—}R^3\text{—}SH$ from step d) with a further portion of $Cl\text{—}R^3\text{—}Cl$ to give $(R^1)_o Si\text{—}R^2\text{—}S\text{—}R^3\text{—}S\text{—}R^3\text{—}Cl$;
f) providing a substance M-S—X where X is as defined in claim 1 and M is metal;
g) reacting $(R^1)_o Si\text{—}R^2\text{—}S\text{—}R^3\text{—}S\text{—}R^3\text{—}Cl$ with M-S—X to give the silane of formula I): $(R^1)_o Si\text{—}R^2\text{—}S\text{—}R^3\text{—}S\text{—}R^3\text{—}S\text{—}X$;
h) optionally purifying the silane of formula I) obtained in step g),
where the two instances of M in steps d) and f) may be identical or different.

For the $R^1$, $R^2$, $R^3$ radicals and o and X, the above remarks are applicable, unless explicitly stated otherwise.

The substances in steps a) and b) may be commercially acquired and provided.

The reaction in step c) is preferably effected in an organic solvent, for example ethanol, especially if at least one $R^1$ radical is ethoxy, or methanol, especially if at least one $R^1$ radical is methoxy.

The reaction in step c) preferably takes place under protective gas atmosphere, for example under argon, and at elevated temperature, for example 60 to 90° C.

Preference is given to first contacting $(R^1)_o Si\text{—}R^2\text{—}SH$ (e.g. 3-(mercaptopropyl)triethoxysilane) with the base, such as sodium ethoxide in particular, especially when at least one $R^1$ is ethoxy, and bringing about the deprotonation on the sulfur atom especially by heating over several hours, for example 1 to 12 hours.

On completion of deprotonation, it is possible to cool to room temperature (RT), and the cooled ethanolic solution of the thiolate obtained after the deprotonation is then added dropwise to $Cl\text{—}R^3\text{—}Cl$ (e.g. 1,6-dichlorohexane) and stirred at elevated temperature, for example 60 to 90° C., over several hours, for example 2 to 12 hours.

The resultant reaction product $(R^1)_o Si\text{—}R^2\text{—}S\text{—}R^3\text{—}Cl$ in step c), according to its state of matter, is isolated and then purified.

In step d), the reaction of $(R^1)_o Si\text{—}R^2\text{—}S\text{—}R^3\text{—}Cl$ from step c) with M-S—H is effected, for example and with preference sodium hydrogensulfide (NaSH), to give $(R^1)_o Si\text{—}R^2\text{—}S\text{—}R^3\text{—}SH$.

The hydrogensulfide, such as sodium hydrogensulfide, is especially anhydrous.

The reaction preferably takes place in a polar aprotic organic solvent, for example dimethylformamide (DMF), and while heating, for example to 50 to 70° C., over several hours, for example 2 to 12 hours.

After cooling, the solvent is removed, and the reaction product $(R^1)_o Si\text{—}R^2\text{—}S\text{—}R^3\text{—}SH$ is extracted, for example by means of ethyl acetate, and purified.

In step e), $(R^1)_o Si\text{—}R^2\text{—}S\text{—}R^3\text{—}SH$ from step d) is reacted with a further portion of $Cl\text{—}R^3\text{—}Cl$ to give $(R^1)_o Si\text{—}R^2\text{—}S\text{—}R^3\text{—}S\text{—}R^3\text{—}Cl$.

The reaction conditions as described for step c) are analogously applicable here.

The reaction product $(R^1)_o Si\text{—}R^2\text{—}S\text{—}R^3\text{—}S\text{—}R^3\text{—}Cl$ is isolated and purified.

In step f), a substance M-S—X is provided, where X is as defined in claim 1, and M is metal, where the metal is selected independently from the metal from step d). For example, and in a preferred embodiment, K—S—X is used in step f), where K represents potassium.

An example substance is potassium thioacetate, which is commercially available and hence provided.

In step g), $(R^1)_o Si\text{—}R^2\text{—}S\text{—}R^3\text{—}S\text{—}R^3\text{—}Cl$ is reacted with K—S—X to give the silane of formula I): $(R^1)_o Si\text{—}R^2\text{—}S\text{—}R^3\text{—}S\text{—}R^3\text{—}S\text{—}X$.

The reaction preferably takes place in a polar aprotic organic solvent, for example dimethylformamide (DMF), and while heating, for example to 40 to 60° C., over several hours, for example 2 to 12 hours.

After cooling, the solvent is removed, and the reaction product of formula I):

$$(R^1)_o Si\text{—}R^2\text{—}S\text{—}R^3\text{—}S\text{—}R^3\text{—}S\text{—}X \qquad \text{I)}$$

is extracted, for example by means of ethyl acetate, and purified.

In process step h), the silane of formula I) obtained in step g) is optionally purified, the nature of the purification being determined by the state of matter in which the silane is obtained.

It is however also conceivable for the prepared silane to be used further, for example absorbed onto silica, without a purification step, as described below.

The present invention further provides a silica modified at least on its surface with at least one silane of the invention.

By way of example, the modification is effected by at least the following process steps:
i) optionally dissolving the inventive silane of formula I) from step g) or h) in an organic solvent;
j) contacting at least one silica with the silane from step g) or h) or the solution from step i), and then stirring the resulting suspension, preferably for 30 minutes to 18 hours;
k) drying the modified silica obtained.

The silica may be any silica known to the person skilled in the art, such as, in particular, the silica types listed in detail below.

These further process steps constitute a modification of silica with the silane prepared in accordance with the invention, and are a further aspect of the present invention.

The rubber mixture of the invention comprises at least one inventive silane of formula I). It is conceivable in principle that the rubber mixture comprises multiple inventive silanes from different embodiments, i.e. possibly having different groups X, and $R^1$, $R^2$ and $R^3$ in the mixture. The rubber mixture may especially also comprise a mixture of two or more silanes I) or II). The rubber mixture may also comprise the inventive silane of the formula I) or II) shown in combination with other silanes known in the prior art, optionally as oligomers, as described above.

Such coupling agents known from the prior art are in particular and by way of example bifunctional organosilanes having at least one alkoxy, cycloalkoxy or phenoxy group as a leaving group on the silicon atom and having as another functionality a group which, possibly after cleavage, can enter into a chemical reaction with the double bonds of the polymer. The latter group may for example be the following chemical groups:

—SCN, —SH, —$NH_2$ or -Sx- (with x=2 to 8).

For example, silane coupling agents used may be 3-mercaptopropyltriethoxysilane, 3-thiocyanatopropyltrimethoxysilane or 3,3'-bis(triethoxysilylpropyl) polysulfides having 2 to 8 sulfur atoms, for example 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT may for example also be added as a mixture with carbon black (trade name X50S® from Evonik).

The prior art also discloses a silane mixture which contains 40% to 100% by weight of disulfides, more preferably 55% to 85% by weight of disulfides and most preferably 60% to 80% by weight of disulfides. Such a mixture is obtainable for example from Evonik under the trade name Si 266® which is described in DE 102006004062 A1 for example.

Blocked mercaptosilanes as known for example from WO 99/09036 may also be used as a silane coupling agent. It is also possible to use silanes as described in WO 2008/083241 A1, WO 2008/083242 A1, WO 2008/083243 A1 and WO 2008/083244 A1. Usable silanes are for example those marketed under the NXT name (e.g. 3-(octanoylthio)-1-propyltriethoxysilane) in a number of variants by Momentive, USA, or those marketed under the VP Si 363® name by Evonik Industries.

It is also possible for silanes mentioned at the outset that have exactly one thioether unit in the spacer group to be additionally present.

In a particularly advantageous embodiment of the invention, the rubber mixture contains the silane of formula II).

The rubber mixture of the invention is preferably a rubber mixture which is suitable for use in vehicle tires and for this purpose preferably contains at least one diene rubber.

Diene rubbers are rubbers which are formed by polymerization or copolymerization of dienes and/or cycloalkenes and thus have C=C double bonds either in the main chain or in the side groups.

The diene rubber is selected here from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight $M_w$ of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are used in the production of industrial rubber articles, such as belts, drive belts and hoses, and/or footwear soles.

Preferably, the diene rubber is selected from the group consisting of natural polyisoprene and/or synthetic polyisoprene and/or butadiene rubber and/or solution-polymerized styrene-butadiene rubber and/or emulsion-polymerized styrene-butadiene rubber.

In a preferred development of the invention, at least two different types of diene rubber are used in the rubber mixture.

The rubber mixture of the invention preferably contains at least one silica as filler, which particularly gives rise to the advantages of the silane of the invention.

If the at least one silane of the invention is added to the rubber mixture of the invention applied to a silica, the rubber mixture may comprise further silicas.

The terms "silicic acid" and "silica" are used synonymously in the context of the present invention.

The silicas may be silicas known to those skilled in the art which are suitable as fillers for tire rubber mixtures. However, particular preference is given to using a finely divided, precipitated silica having a nitrogen surface area (BET surface area) (in accordance with DIN ISO 9277 and DIN 66132) of 35 to 400 m²/g, preferably of 35 to 350 m²/g, more preferably of 100 to 320 m²/g and most preferably of 100 to 235 m²/g, and a CTAB surface area (in accordance with ASTM D 3765) of 30 to 400 m²/g, preferably of 30 to 330 m²/g, more preferably of 95 to 300 m²/g and most preferably of 95 to 200 m²/g.

Such silicas result, for example in rubber mixtures for inner tire components, in particularly good physical properties of the vulcanizates. Advantages in mixture processing by way of a reduction in mixing time can also result here while retaining the same product properties, leading to improved productivity. Examples of silicas that can be used thus include not only those of the Ultrasil® VN3 (trade name) type from Evonik but also silicas having a comparatively low BET surface area (for example Zeosil® 1115 or Zeosil® 1085 from Solvay) and highly dispersible silicas, called HD silicas (for example Zeosil® 1165 MP from Solvay).

The amount of the at least one silica here is preferably 5 to 300 phr, more preferably 10 to 200 phr, most preferably 20 to 180 phr. In the case of different silicas, the indicated amounts mean the total amount of silicas present.

The unit "phr" (parts per hundred parts of rubber by weight) used in this document is the conventional indication of quantity for mixture recipes in the rubber industry. The dosage of the parts by weight of the individual substances is based in this document on 100 parts by weight of the total mass of all high molecular weight (Mw greater than 20 000 g/mol) and hence solid rubbers present in the mixture.

The indication "phf" (parts per hundred parts of filler by weight) used in this document is the conventional indication of quantity for coupling agents for fillers in the rubber industry. In the context of the present application, phf relates to the silica present, meaning that any other fillers present, such as carbon black, are not included in the calculation of the amount of silane.

The inventive rubber mixture preferably comprises at least one silane of formula I), preferably at least the silane of formula II), in an amount of 1 to 25 phr, and in the preferred case with silica as filler preferably 2 to 20 phf.

The silane(s) of the invention is/are preferably added during the production of the rubber mixture of the invention in at least one base-mixing stage which preferably contains at least one diene rubber and preferably at least one silica as filler.

The present invention thus further provides a process for producing the rubber mixture of the invention, wherein at least one silane of the invention as described above is added preferably in at least one base-mixing stage.

In an advantageous embodiment of the invention, the at least one silane of the invention is adsorbed onto silica beforehand and in this form is mixed into the rubber mixture.

In the process of the invention for producing the rubber mixture of the invention, it is therefore preferable if the at least one silane of the invention is adsorbed onto silica beforehand and is mixed in this form into the rubber mixture.

The rubber base mixture comprising at least one silane of the invention and/or one silica of the invention is subsequently processed to give a finished rubber mixture by adding vulcanization chemicals (see below), in particular a sulfur vulcanization system, and then vulcanized, which affords an inventive vulcanizate of the inventive rubber mixture.

Further aspects of the present invention are the production of a base rubber mixture comprising at least one silane of the invention and/or one silica of the invention, and the production of a finished rubber mixture comprising at least one silane of the invention and/or one silica of the invention, and the production of an inventive vulcanizate of the inventive rubber mixture.

The rubber mixture of the invention may contain carbon black as a further filler, specifically preferably in amounts of 2 to 200 phr, more preferably 2 to 70 phr.

The rubber mixture of the invention may contain further fillers, preferably in minimal amounts, i.e. preferably 0 to 3 phr. Within the context of the present invention, the further (non-reinforcing) fillers include aluminosilicates, kaolin, chalk, starch, magnesium oxide, titanium dioxide, or rubber gels and also fibers (for example aramid fibers, glass fibers, carbon fibers, cellulose fibers).

Further, optionally reinforcing, fillers are for example carbon nanotubes ((CNTs), including discrete CNTs, hollow carbon fibers (HCF) and modified CNTs containing one or more functional groups such as hydroxy, carboxy and carbonyl groups), graphite and graphene and what is known as "carbon-silica dual-phase filler".

In the context of the present invention zinc oxide is not included among the fillers.

The rubber mixture can further contain customary additives in customary parts by weight which are added preferably in at least one base-mixing stage during the production of said mixture. These additives include a) aging stabilizers, for example N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ), b) activators, for example zinc oxide and fatty acids (e.g. stearic acid) and/or other activators, such as zinc complexes, for example zinc ethylhexanoate, c) antiozonant waxes, d) resins, especially tackifying resins for inner tire components, e) masticating aids, for example 2,2'-dibenzamidodiphenyl disulfide (DBD), and f) processing aids, such as, in particular, fatty acid esters and metal soaps, for example zinc soaps and/or calcium soaps, g) plasticizers, such as, in particular, aromatic, naphthenic or paraffinic mineral oil plasticizers, for example MES (mild extraction solvate) or RAE (residual aromatic extract) or TDAE (treated distillate aromatic extract), or rubber-to-liquid (RTL) oils or biomass-to-liquid (BTL) oils, preferably having a content of polycyclic aromatics of less than 3% by weight according to method IP 346 or triglycerides, for example rapeseed oil, or factices or hydrocarbon resins or liquid polymers, the mean molecular weight of which (determination by GPC=gel permeation chromatography, using a method based on BS ISO 11344:2004) is between 500 and 20 000 g/mol, with mineral oils being particularly preferred as plasticizers.

When mineral oil is used, it is preferably selected from the group consisting of DAE (distilled aromatic extracts) and/or RAE (residual aromatic extract) and/or TDAE (treated distilled aromatic extracts) and/or MES (mild extracted solvents) and/or naphthenic oils.

The total proportion of further additives is preferably 3 to 150 phr, more preferably 3 to 100 phr and most preferably 5 to 80 phr.

Zinc oxide (ZnO) may be included in the total proportion of further additives in the abovementioned amounts.

This may be any type of zinc oxide known to those skilled in the art, for example ZnO granules or powder. The zinc oxide conventionally used generally has a BET surface area of less than 10 $m^2/g$. However, it is also possible to use a zinc oxide having a BET surface area of 10 to 100 $m^2/g$, for example so-called "nano zinc oxides".

The vulcanization of the rubber mixture of the invention is preferably conducted in the presence of sulfur and/or sulfur donors with the aid of vulcanization accelerators, it being possible for some vulcanization accelerators to act simultaneously as sulfur donors. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS) or a guanidine accelerator such as diphenylguanidine (DPG).

The sulfur donor substances used may be any sulfur donor substances known to those skilled in the art. If the rubber mixture contains a sulfur donor substance, the latter is preferably selected from the group comprising for example thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis (O,O-2-ethylhexylthiophosphoryl) polysulfide (e.g. Rhenocure SDT 50®, Rheinchemie GmbH) and/or zinc dichloryldithiophosphate (e.g. Rhenocure ZDT/S®, Rheinchemie GmbH) and/or zinc alkyldithiophosphate, and/or 1,6-bis(N,N-dibenzylthiocarbamoyldithio)hexane and/or diaryl polysulfides and/or dialkyl polysulfides.

Further network-forming systems such as can be obtained for example under the trade names Vulkuren®, Duralink® or Perkalink®, or network-forming systems as described in WO 2010/049216 A2, can also be used in the rubber mixture. This system contains a vulcanizing agent which crosslinks with a functionality of greater than four and at least one vulcanization accelerator.

It is particularly preferable to use the accelerators TBBS and/or CBS and/or diphenylguanidine (DPG). Vulcanization retarders may also be present in the rubber mixture.

The terms "vulcanized" and "crosslinked" are used synonymously in the context of the present invention.

In a preferred development of the invention, a plurality of accelerators are added in the final mixing stage during the production of the sulfur-crosslinkable rubber mixture.

The sulfur-crosslinkable rubber mixture of the invention is produced by the process that is customary in the rubber industry, in which, in one or more mixing stages, a base mixture comprising all constituents except for the vulcanization system (sulfur and vulcanization-influencing substances) is first produced. The finished mixture is produced by adding the vulcanization system in a final mixing stage.

The finished mixture is for example processed further and brought into the appropriate shape by means of an extrusion operation or calendering.

This is followed by further processing by vulcanization, wherein sulfur crosslinking takes place due to the vulcanization system added within the context of the present invention.

The above-described rubber mixture of the invention is particularly suitable for use in vehicle tires, especially pneumatic vehicle tires. Application in all tire components is in principle conceivable here, in particular in a tread, especially in the cap of a tread of cap/base construction.

The cap here is the part of the tread of the vehicle tire that comes into contact with the driving surface, while the base is the inner part of the tread that is located radially beneath the cap and does not come into contact with the driving surface.

For use in vehicle tires, the mixture, as a finished mixture prior to vulcanization, is preferably brought into the shape of a tread and is applied in the known manner during production of the green vehicle tire.

The production of the rubber mixture of the invention, for use as a sidewall or other body mixture in vehicle tires, is effected as has already been described. The difference lies in the shaping after the extrusion operation/the calendering of the mixture. The shapes thus obtained of the as-yet unvulcanized rubber mixture for one or more different body mixtures then serve for the construction of a green tire.

"Body mixture" refers here to the rubber mixtures for the inner components of a tire, such as essentially squeegee, inner liner (inner layer), core profile, belt, shoulder, belt profile, carcass, bead reinforcement, bead profile, flange profile and bandage. The as-yet unvulcanized green tire is subsequently vulcanized.

For use of the rubber mixture of the invention in drive belts and other belts, especially in conveyor belts, the extruded, as-yet unvulcanized mixture is brought into the appropriate shape and often provided at the same time or subsequently with strength members, for example synthetic fibers or steel cords. This usually affords a multi-ply construction consisting of one and/or more plies of rubber mixture, one and/or more plies of identical and/or different strength members and one and/or more further plies of the same and/or another rubber mixture.

The present invention further provides a vehicle tire comprising the rubber mixture of the invention containing at least one silane of the invention in at least one component.

The vulcanized vehicle tire, in at least one component, comprises a vulcanizate of at least one rubber mixture of the invention. It is known to those skilled in the art that most substances, for example the rubbers and silanes present, in particular the silane of the invention, are present in chemically modified form either already after mixing or only after vulcanization.

Within the context of the present invention, "vehicle tires" are to be understood to mean pneumatic vehicle tires and solid rubber tires, including tires for industrial and construction site vehicles, truck, car and two-wheeled-vehicle tires.

The vehicle tire of the invention preferably comprises the rubber mixture of the invention at least in the tread.

The vehicle tire of the invention preferably comprises the rubber mixture of the invention at least in the sidewall.

The rubber mixture of the invention is additionally also suitable for other components of vehicle tires, for example the flange profile in particular, and also for inner tire components. Moreover, the rubber mixture of the invention is also suitable for other industrial rubber articles, such as bellows, conveyor belts, air springs, belts, drive belts or hoses, and also footwear soles.

The invention will be explained in detail hereinafter with reference to working examples. The silane of formula III), as an example according to the invention, was prepared in the following way:

1. Preparation of (3-((6-chlorohexyl)thio)propyl)triethoxysilane; $(EtO)_3Si(CH_2)_3S(CH_2)_6Cl$ According to the Synthesis Scheme for Formula III)

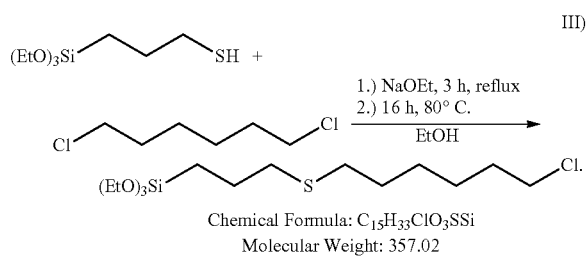

Chemical Formula: $C_{15}H_{33}ClO_3SSi$
Molecular Weight: 357.02

To a solution of sodium ethoxide (12.84 g, 189.0 mmol, 1.0 eq.) in ethanol (60 mL) was added 3-(mercaptopropyl)triethoxysilane (45.6 mL, 45.00 g, 189.0 mmol, 1.0 equivalent (eq.).) dropwise at 60° C. under an argon atmosphere over the course of 5 min. Subsequently, the orange reaction mixture was heated under reflux for 3 h in order to complete the deprotonation, and then allowed to cool back down to room temperature (RT). The ethanolic solution of the thiolate was transferred to a dropping funnel and added dropwise to 1,6-dichlorohexane (110.0 mL, 117.0 g, 755.0 mmol, 4.0 eq.) at 80° C. over 30 min. The resulting suspension was then stirred at 80° C. overnight. The resultant white solid (NaCl) was filtered off by means of a Buchner funnel, and the target molecule was purified by means of fractional distillation. The target compound was isolated as the second fraction (at about 140° C., 0.3 mbar) in the form of a pale yellow liquid (34.3 g, 96.0 mmol, 51%).

$^1$H NMR (nuclear magnetic resonance) (500 MHz, DMSO-$d_6$) δ 3.75 (q, J=7.0 Hz, 6H, —SiOC$H_2$CH$_3$), 3.62 (t, J=6.6 Hz, 2H, —C$H_2$C$_1$), 2.47 (dd, J=14.9, 7.5 Hz, 4H, —SC$H_2$—), 1.71 (dq, J=8.0, 6.6 Hz, 2H, —SiCH$_2$CH$_2$C$H_2$—), 1.62-1.49 (m, 4H, —C$H_2$—), 1.42-1.33 (m, 4H, —C$H_2$—), 1.15 (t, J=7.0 Hz, 9H, —SiOCH$_2$C$H_3$), 0.70-0.64 (m, 2H, —SiC$H_2$CH$_2$CH$_2$—).

$^{13}$C NMR (126 MHz, DMSO-$d_6$) δ 57.72, 45.34, 34.03, 31.98, 30.85, 29.11, 27.47, 25.90, 18.23, 9.24.

ESI-MS (electrospray ionization mass spectrometry) m/z (%): 311.13 [M+H–EtOH]$^+$ (100).

2. Preparation of (3-((6-mercaptohexyl)thio)propyl)triethoxysilane; $(EtO)_3Si(CH_2)_3S(CH_2)_6SH$ According to the Synthesis Scheme for Formula IV)

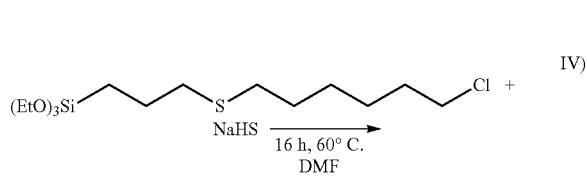

-continued

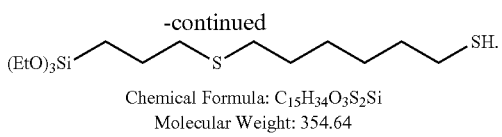

Chemical Formula: $C_{15}H_{34}O_3S_2Si$
Molecular Weight: 354.64

To a solution of anhydrous sodium hydrogensulfide (NaHS) (3.77 g, 67.2 mmol, 1.2 eq.) in dimethylformamide (DMF) (40 mL) was added dropwise, at 60° C. under an argon atmosphere, (3-((6-chlorohexyl)thio)propyl)triethoxysilane (20.00 g, 56.0 mmol, 1.0 eq.) over a period of 10 min. The resulting suspension was then stirred at 60° C. overnight.

After cooling to RT, the solvent was removed under reduced pressure, and the residue was taken up in demineralized water (50 mL) and extracted with ethyl acetate (3×50 mL). The combined organic phases were washed with demineralized water (50 mL) and dried over sodium sulfate, and the solvent was removed under reduced pressure.

After column chromatography purification on silica gel (120 g, cyclohexane/ethyl acetate 0% → 5%), it was possible to isolate the target compound as a colourless liquid (11.15 g, 31.4 mmol, 56%).

$^1$H NMR (500 MHz, DMSO-d$_6$) δ 3.74 (q, J=7.0 Hz, 6H, —SiOCH$_2$CH$_3$), 2.49-2.43 (m, 6H, —SCH$_2$—), 2.19 (t, J=7.7 Hz, 1H, —SH), 1.60-1.46 (m, 6H, —CH$_2$—), 1.36-1.29 (m, 4H, —CH$_2$—), 1.15 (t, J=7.0 Hz, 9H, —SiOCH$_2$CH$_3$), 0.69-0.63 (m, 2H, —SiCH$_2$CH$_2$CH$_2$—).

$^{13}$C-NMR (126 MHz, chloroform-d) δ 58.48, 35.25, 33.98, 31.94, 29.65, 28.42, 28.06, 24.67, 23.32, 18.42, 9.99.

ESI-MS m/z (%): 309.14 [M+H−EtOH]$^+$ (100).

3. Preparation of 1-(1-thio-3-(triethoxysilyl)propyl)-6-(1-thio-6-chlorohexyl)hexane; (EtO)$_3$Si(CH$_2$)$_3$S(CH$_2$)$_6$S(CH$_2$)$_6$Cl According to the Synthesis Scheme for Formula V)

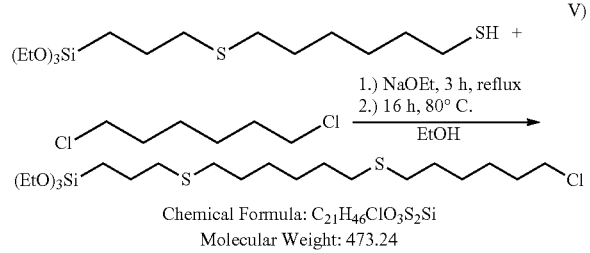

Chemical Formula: $C_{21}H_{46}ClO_3S_2Si$
Molecular Weight: 473.24

To a solution of sodium ethoxide (0.77 g, 11.3 mmol, 1.0 eq.) in ethanol (40 mL) was added (3-((6-mercaptohexyl)thio)propyl)triethoxysilane (4.00 g, 11.3 mmol, 1.0 eq.) at 60° C. under an argon atmosphere. Subsequently, the reaction mixture was heated at 80° C. for 3 h in order to complete the deprotonation, and then allowed to cool back down to RT.

The ethanolic solution of the thiolate was transferred to a dropping funnel and added dropwise to 1,6-dichlorohexane (19.7 mL, 20.99 g, 135.0 mmol, 12.0 eq.) at 80° C. over 15 min. The resulting suspension was then stirred at 80° C. overnight.

The resultant white solid (NaCl) was filtered off by means of a Buchner funnel, and excess 1,6-dichlorohexane was removed under reduced pressure.

After column chromatography purification on silica gel (80 g, cyclohexane/ethyl acetate 0% → 5%), it was possible to isolate the target compound as a colourless oil (2.30 g, 4.9 mmol, 43%).

$^1$H NMR (500 MHz, DMSO-d$_6$) δ 3.75 (q, J=7.0 Hz, 6H, —SiOCH$_2$CH$_3$), 3.62 (t, J=6.6 Hz, 2H, —CH$_2$Cl), 2.49-2.43 (m, 8H, —SCH$_2$—), 1.71 (dq, J=7.9, 6.5 Hz, 2H, —SiCH$_2$CH$_2$CH$_2$—), 1.61-1.46 (m, 8H, —CH$_2$—), 1.42-1.31 (m, 8H, —CH$_2$—), 1.15 (t, J=7.0 Hz, 9H, —SiOCH$_2$CH$_3$), 0.69-0.63 (m, 2H, —SiCH$_2$CH$_2$CH$_2$—).

$^{13}$C NMR (126 MHz, DMSO-d$_6$) δ 57.64, 45.21, 34.03, 31.93, 31.04, 30.99, 30.89, 29.11, 29.02, 28.97, 27.75, 27.40, 25.83, 22.90, 18.14, 9.21.

ESI-MS m/z (%): 427.19 [M+H−EtOH]$^+$ (100), 490.26 [M+Na]$^+$ (10).

4. Preparation of the silane of formula II) 1-(1-thio-3-(triethoxysilyl)propyl)-6-(1-thio-6-thioacetylhexyl)hexane; (EtO)$_3$Si(CH$_2$)$_3$S(CH$_2$)$_6$S(CH$_2$)$_6$SAc According to the Synthesis Scheme for Formula VI)

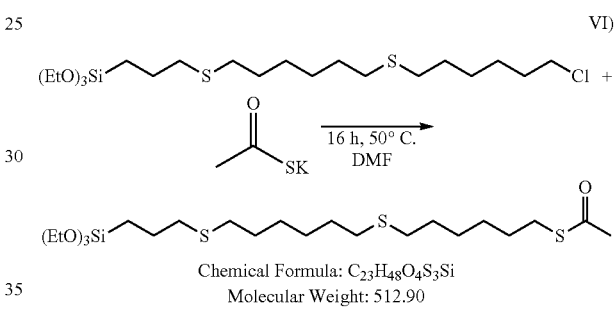

Chemical Formula: $C_{23}H_{48}O_4S_3Si$
Molecular Weight: 512.90

To a solution of potassium thioacetate (1.20 g, 10.5 mmol, 1.5 eq.) in DMF (20 mL) was added 1-(1-thio-3-(triethoxysilyl)propyl)-6-(1-thio-6-chlorohexyl)hexane (3.19 g, 6.7 mmol, 1.0 eq.) dropwise at 50° C. over a period of 10 min.

The resultant yellowish suspension was stirred at 50° C. overnight, then cooled down to RT, and the white solid (NaCl) was filtered off by means of a Buchner funnel. Ethyl acetate (50 mL) was added to the filtrate, and the organic phase was washed with demineralized water (2×50 mL) and saturated NaCl solution (2×50 mL), and dried over Na$_2$SO$_4$. The solvent was removed under reduced pressure. There was no column chromatography purification on silica gel since the crude product showed sufficiently high purity and the yield would otherwise be much lower.

After drying under high vacuum, the target compound was isolated as a pale yellow oil (3.13 g, 6.1 mmol, 91%).

$^1$H NMR (500 MHz, DMSO-d$_6$) δ 3.74 (q, J=7.0 Hz, 6H, —SiOCH$_2$CH$_3$), 2.81 (t, J=7.2 Hz, 2H, —CH$_2$SC(O)CH$_3$), 2.49-2.42 (m, 8H, —SCH$_2$—), 2.31 (s, 3H, —SC(O)CH$_3$), 1.60-1.52 (m, 2H, —SiCH$_2$CH$_2$CH$_2$—), 1.53-1.45 (m, 8H, —CH$_2$—), 1.33 (td, J=7.1, 3.4 Hz, 8H, —CH$_2$—), 1.14 (t, J=7.0 Hz, 9H, —SiOCH$_2$CH$_3$), 0.69-0.62 (m, 2H, —SiCH$_2$CH$_2$CH$_2$—). $^{13}$C NMR (126 MHz, DMSO-d$_6$) δ 195.10, 57.64, 34.01, 31.01, 30.98, 30.88, 30.48, 29.11, 29.00, 28.93, 28.23, 27.74, 27.67, 27.61, 22.89, 18.14, 9.20.

ESI-MS m/z (%): 467.21 [M+H−EtOH]$^+$ (61), 530.28 [M+NH$_4$]$^+$ (100).

The prepared silane of formula II) is mixed into an inventive rubber mixture comprising at least one diene rubber and at least one silica as filler. To this end, the silane of formula II) is preferably adsorbed onto a silica beforehand and subsequently added in this form to the rubber mixture.

Adsorption onto silica is carried out, for example, as follows:

To a suspension of silica, for example pelletized silica, in DMF is added, at room temperature, a solution of the silane of formula II) in the desired silica/silane ratio dissolved in DMF. For example, silica (VN3, Evonik) and 14.4 phf of silane of formula II) are used.

The resulting suspension is for example stirred overnight at 120° C. and the solvent is subsequently removed under reduced pressure. After drying for one day under high vacuum at 40° C., the modified silica thus obtained is comminuted by means of a mortar, possibly according to the fineness desired. It is then for example dried under high vacuum for a further day at 40° C.

The rubber mixture of the invention is by way of example applied to a green tire in the form of a preformed tread of a vehicle tire (as described above) and subsequently vulcanized therewith.

The invention will be further illustrated in detail by comparative examples and working examples of rubber mixtures which are summarized in table 1. The comparative mixtures are labeled V, the inventive mixtures E. The amount of the silanes in phf is based on the respective amount of silica.

The mixtures were produced under customary conditions in multiple stages in a twin-screw extrusion mixer. Test specimens were produced by vulcanization from all of the mixtures, and these test specimens were used to determine material properties typical for the rubber industry.

The described tests on test specimens were carried out by the following test methods:
  Standard: ISO 868, DIN 53 505; Shore A hardness at room temperature and 70° C.
  Standard: ISO 4662, DIN 53 512; resilience at room temperature and 70° C.
  Standard: DIN 53 513; maximum loss factor tan δmax at 55° C. as the maximum over the strain sweep from dynamic-mechanical measurement
  Standard: ASTM D6601; loss factor tan δ (10%) and dynamic storage modulus (G'(1%), G'(100%)) of the second strain sweep at 1 Hz and 70° C.
  Standard: ISO 37, ASTM D 412, DIN 53 504; elongation at break at room temperature and fracture energy density at room temperature determined by a tensile test, the fracture energy density being the work required for fracture, based on the volume of the sample.
a) NR TSR: natural rubber.
b) SSBR: solution-polymerized styrene-butadiene copolymer from the prior art having hydroxyl groups, Nipol® NS 612, from Zeon Corporation.
c) Silica: VN3, from Evonik.
d) Silane in the appropriate amount was presilanized/reacted with the silica mentioned in a separate step. Silica and silane were fed to the mixing process together as modified filler.
e) Further additives: zinc oxide/aging stabilizer/antiozonant/stearic acid Inventive mixture E1 (comprising the inventive silane of formula II)), by comparison with reference mixture V1 (comprising the silane TESPD), shows reduced RT resilience and elevated 70° C. resilience. This increase in the differential (70° C. resilience—RT resilience) is advantageous in terms of the trade-off between rolling resistance and grip characteristics, and the maximum loss factor for E1 is additionally lower than for V1. These properties show the person skilled in the art an improvement in rolling resistance in the application of tires.

A predictor for increased stiffness observed for E1 compared to V1 is an increase in Shore A hardness at RT and 70° C.

Moreover, in the case of E1, elevated elongation at break and fracture energy density compared to V1 are observed.

These different properties lead to improved service life and tear resistance with simultaneous improvement in rolling resistance characteristics, and clearly show the benefit of the silanes of the invention over the prior art.

TABLE 1

| | Unit | V1 | E1 |
|---|---|---|---|
| Constituents | | | |
| NR TSR a) | phr | 20 | 20 |
| SSBR b) | phr | 80 | 80 |
| Silica c) | phr | 95 | 95 |
| Silane TESPD d) | phf | 7.2 | — |
| Silane of formula II d) | phf | — | 15.6 |
| TDAE | phr | 35 | 35 |
| Further additives e) | phr | 9 | 9 |
| DPG | phr | 2 | 2 |
| CBS | phr | 1.6 | 1.6 |
| Sulfur | phr | 2 | 2 |
| Physical measurements | | | |
| Shore A hardness RT | ShA | 75.9 | 76.2 |
| Shore A hardness 70° C. | ShA | 71.7 | 73.5 |
| Resilience RT | % | 18.2 | 18.0 |
| Resilience 70° C. | % | 46.4 | 47.6 |
| Tan d (max) | — | 0170 | 0163 |
| Elongation at break RT (S3) | % | 117 | 151 |
| Fracture energy density (S3) | J/cm³ | 5 | 8 |

The invention claimed is:
1. A silane of formula I):

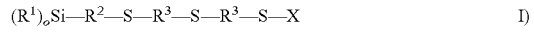

wherein o may be 1, 2 or 3 and the $R^1$ radicals may be identical or different and are selected from alkoxy groups having 1 to 10 carbon atoms, cycloalkoxy groups having 4 to 10 carbon atoms, phenoxy groups having 6 to 20 carbon atoms, aryl groups having 6 to 20 carbon atoms, alkyl groups having 1 to 10 carbon atoms, alkenyl groups having 2 to 20 carbon atoms, alkynyl groups having 2 to 20 carbon atoms, aralkyl groups having 7 to 20 carbon atoms, halides, or alkyl polyether groups —O—($R^6$—O)$_r$—$R^5$ wherein $R^6$ are identical or different and are branched or unbranched, saturated or unsaturated, aliphatic, aromatic or mixed aliphatic/aromatic bridging $C_1$-$C_{30}$ hydrocarbon groups, preferably —CH$_2$—CH$_2$—, r is an integer from 1 to 30, preferably 3 to 10, and $R^5$ are unsubstituted or substituted, branched or unbranched, terminal alkyl, alkenyl, aryl or aralkyl groups, preferably —$C_{13}H_{27}$ alkyl group;

or two $R^1$ form a cyclic dialkoxy group having 2 to 10 carbon atoms, in which case o is <3;

or two or more silanes of formula I) may be bridged via $R^1$ radicals;

wherein $R^2$ and $R^3$ may be identical or different and are selected from the group consisting of linear or branched alkylene groups having 1 to 20 carbon atoms or cycloalkyl groups having 4 to 12 carbon atoms or aryl groups having 6 to 20 carbon atoms or alkenyl groups having 2 to 20 carbon atoms, alkynyl groups having 2 to 20 carbon atoms or aralkyl groups having 7 to 20 carbon atoms;

wherein the X group is a hydrogen atom or a —C(=O)—$R^4$ group or an —$SiR^7_3$ group, where $R^4$ and $R^7$ are selected from $C_1$-$C_{20}$-alkyl groups, $C_4$-$C_{10}$-cycloalkyl groups, $C_6$-$C_{20}$-aryl groups, $C_2$-$C_{20}$-alkenyl groups and $C_7$-$C_{20}$-aralkyl groups, and $R^7$ is additionally selected from alkoxy groups having 1 to 10 carbon atoms, cycloalkoxy groups having 4 to 10 carbon atoms, phenoxy groups having 6 to 20 carbon atoms; and where the silane may also take the form of oligomers formed via hydrolysis and condensation of silanes of the formula I);

wherein the silane modifies the surface of a silica;

wherein a rubber mixture contains the silane; and, wherein the silane is prepared by a process which comprises at least the following process steps:
   a) providing a substance $(R^1)_o$Si—$R^2$—SH;
   b) providing a substance Cl—$R^3$—Cl;
   c) reacting the substance from step a) with the substance from step b) in the presence of a base to give $(R^1)_o$Si—$R^2$—S—$R^3$—Cl;
   d) reacting $(R^1)_o$Si—$R^2$—S—$R^3$—Cl from step c) with a metallic hydrogensulfide (M-S—H) to give $(R^1)_o$Si—$R^2$—S—$R^3$—SH, where M is metal;
   e) reacting $(R^1)_o$Si—$R^2$—S—$R^3$—SH from step d) with a further portion of Cl—$R^3$—Cl to give $(R^1)_o$Si—$R^2$—S—$R^3$—S—$R^3$—Cl;
   f) providing a substance M-S-X where the X group is a hydrogen atom or a —C(=O)—$R^4$ group or an —$SiR^7_3$; group, where $R^4$ and $R^7$ are selected from $C_1$-$C_{20}$ alkyl groups, $C_4$—$C_{10}$—cycloalkyl groups, $C_6$—$C_{20}$—aryl groups, $C_2$—$C_{20}$—alkenyl groups and $C_7$—$C_{20}$—aralkyl groups, and $R^7$ is additionally selected from alkoxy groups having 1 to 10 carbon atoms, cycloalkoxy groups having 4 to 10 carbon atoms, phenoxy groups having 6 to 20 carbon atoms and M is metal:
   g) reacting $(R^1)_o$Si—$R^2$—S—$R^3$—S—$R^3$—Cl with M-S—X to give the silane of formula I): $(R^1)_o$Si—$R^2$—S—$R^3$—S—$R^3$—S—X;
   h) optionally purifying the silane of formula I) obtained in step g), wherein the two instances of M in steps d) and f) may be identical or different.

2. The silane as claimed in claim 1, wherein the $R^3$ radicals are identical and are linear alkylene radicals having 1 to 20 carbon atoms, preferably 2 to 10 carbon atoms, more preferably 4 to 8 carbon atoms.

3. The silane as claimed in claim 1, wherein the X group is a —C(=O)—$R^4$ group and wherein $R^4$ is selected from $C_1$-$C_{20}$-alkyl groups.

4. The silane as claimed in claim 1, wherein the $R^1$ radicals are identical or different and are alkoxy groups having 1 to 6 carbon atoms or halides.

5. The silane as claimed in claim 1, wherein the $R^2$ radical is a linear or branched alkylene group having 2 to 8 carbon atoms.

6. The silane as claimed in claim 1, wherein the silane has the following formula II):

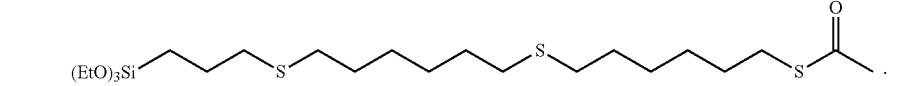

40

7. A vehicle tire comprising the rubber mixture as claimed in claim 1 in at least one component.

* * * * *